United States Patent [19]
Lawson, Jr.

[11] 3,879,659
[45] Apr. 22, 1975

[54] CABLE TESTING APPARATUS WITH CONICAL REEL

[76] Inventor: William H. Lawson, Jr., 4715 Webb Canyon Rd., Claremont, Calif. 91711

[22] Filed: Jan. 2, 1974

[21] Appl. No.: 429,497

[52] U.S. Cl. .............................. 324/52; 242/54 R
[51] Int. Cl. ...................... G01r 31/08; B65h 75/00
[58] Field of Search ............ 324/51, 52, 54; 242/54, 242/86, 83, 86.2; 73/158; 191/12.2 A, 12.2 R, 12.4

[56] References Cited
UNITED STATES PATENTS

| | | | |
|---|---|---|---|
| 289,960 | 12/1883 | Billings | 242/86 |
| 664,896 | 1/1901 | Robertson | 242/83 |
| 828,562 | 8/1906 | Melven | 242/86.2 |
| 1,938,684 | 12/1933 | Bond et al. | 324/54 |
| 2,401,398 | 6/1946 | Wright | 324/54 |
| 2,476,278 | 7/1949 | Boynton | 324/54 |
| 2,709,553 | 5/1955 | Wellcome | 242/54 R |
| 2,930,539 | 3/1960 | Bremer | 242/86 X |
| 3,630,461 | 12/1971 | Sugasti | 242/54 |
| 3,763,426 | 10/1973 | Wilkes | 324/54 |

*Primary Examiner*—Gerard R. Strecker
*Attorney, Agent, or Firm*—Lawrence Fleming

[57] ABSTRACT

An apparatus for inspecting, and locating faults in, electrical cable, prior to reconditioning. In reconditioning a heavy power cable of the type used to feed power to an electric pump at the bottom of an oil well, for example, internal shorts or grounds are located by passing substantial electrical power through the short or ground, and marking the hot spot. When the cable is wound on a conventional drum-type reel, the hot spot may occur on an inside layer, so that it is difficult to locate. Alternatively, the cable may be laid out on a floor, but this prior method is undesirable with long heavy cables. The invention provides a large conical reel, on which a cable, e.g., a mile long, is wound in a single layer. Its entire length is exposed for inspection. Hot spots may be located unambiguously by observing the smoke, or by means of a radiation thermometer. Additionally, two or more drum-type reels may be provided on swivelling cradles adjacent the conical reel. These in combination with the novel conical reel may be used to permit cutting out an incorrect type of splice and resplicing to the opposite end of the remaining portion of the cable.

10 Claims, 6 Drawing Figures

CABLE TESTING APPARATUS WITH CONICAL REEL

BACKGROUND

Cables of the type used to feed power to electric pumps at the bottoms of oil wells may typically be a mile long. Cables that fail in service are reconditioned, as by cutting out defective sections and splicing in new ones. A typical cable of this class may be about 1½ inches in diameter, steelarmored in the manner of commerical "BX" cable, and have three No. 1 or No. 2 AWG conductors, insulated for several thousand volts.

Conventionally, a failed cable is wound slowly from one ordinary drum-type reel to another, and the visible defects—such as corrosion holes or dents in the armor—are marked with paint as they pass by. The reels are rotated by variable-speed motor means under control of the inspectors.

Internal short-circuits, or grounds to the cable armor, or near-shorts, must be located by electrical means. A common method is to pass relatively high electric power through the short or ground and note where the cable gets hot. It may typically emit smoke and fire along a few inches of its length. When the cable is wound on an ordinary drum-type reel, the hot spot may be on an inside layer, and its location ambiguous and impractical to mark.

Another prior method of handling for short location is to lay the cable out on a floor or on the ground, zigzag fashion. For a cable a mile long, however, weighing of the order of 5 tons, this method is slow and expensive. Moreover, such armored cable does not tolerate sharp bends, and may thus be damaged.

There is hence a need for a means to render a long piece of heavy cable all visible at once, throughout its whole length, without using excessive space and time.

In addition, some cables are encountered which have been previously spliced with the adjacent cable ends having armor wrapped with the "lay" or direction of the wound helix, in opposite directions on each side of the splice. Such cable is overly susceptible to damage in use; the splice should be cut and one of the cable sections then turned end-for-end, and a new splice made to the opposite end. It is desirable to provide a means for convenient reeling and dereeling of the cable, in a fashion to permit this to be done.

BRIEF SUMMARY

The invention provides a novel cable-inspection reel of generally conical shape, rotatable by a variable-speed motor drive. Its axis is vertical. The diameter at the base may be 25 or 30 feet or more, to accommodate long lengths of heavy cable.

A cable to be inspected is wound slowly from a known drum-type shipping reel onto the conical reel. Visible defects, such as corrosion holes and dents in the armor, may be marked with colored paint as the winding proceeds. Internal faults, such as shorts (short-circuits) or near-shorts between conductors, or shorts (grounds) between one or more conductors and the cable armor, are preferably located after all the cable has been wound onto the novel conical reel and its whole length exposed to view. Heavy electric power may then be passed between the shorted conductors (located by resistance measurements), or between a conductor and the cable armor, as required.

For a relatively high-resistance short or ground, the fault-locating power supply may be a variable high-voltage type, such as 0–13 kilovolts. For a low-resistance short, the supply may have a much lower impedance, and may be an arc welder capable of supplying of the order of 0 to 300 amperes at low voltage. Either type of supply may have a capacity of several kilowatts.

The resulting hot spot on the cable may then be located from the local emission of smoke and/or fire. With the higher-resistance shorts or grounds, the hot spots may be located with a known type of radiation thermometer, scanning the cable on the conical reel.

Preferably, at least two mounts or cradles for prior drum-type cable reels are provided adjacent the novel conical reel. These cradles are preferably mounted on bearings which permit them to swivel about a vertical central axis, and preferably also have variable-speed motor driving means for the reels, under control of the operator.

In ordinary inspection, the cable is de-reeled from one of the drums and reeled onto the novel conical reel, the operators maintaining a suitable amount of slack by manipulation of the variable-speed drives of the reels, and an inspector marking the visible faults in the exterior of the cable. This requires one drum reel plus the conical reel. The drum reel may be the same one on which the cable was received.

Occasions occur when a second drum reel and cradle is required. A cable, received for reconditioning, may contain a splice with the lay or direction of the helix of the wrapped armor in opposite directions on either side of the splice. Since the whole cable should have armor directed "down hole", the direction of the helix should be the same throughout the length of the cable, to reduce the probability of damage to the cable when it is lowered down the oil well. According to the invention, a second drum reel and swivelling cradle, similar to the first, is provided. An incorrect splice encountered in inspection, i.e., a splice with the adjacent ends of the cable having lay in opposite directions, may, according to the invention, be cut and the remaining length of cable wound from the conical reel onto the second drum reel. The outer end of this remaining length will then be the inner end on the second drum reel. Thence, the outer end of cable on the drum reel may be spliced to the outer, or loose, end of cable that is waiting on the first drum reel. The result will be a splice with the lay the same on both sides, as is proper.

Thus, the invention comprises a conical reel of novel kind, power supplies, and additional drum-type reels in swivelling cradles for the location of faults in the repair of heavy electrical cable.

The invention also provides an improved means for measuring the total length of cable on the conical reel. A rule substantially equal in length to the slant height of the cone is calibrated so as to determine the total length of cable wound thereon. The calibration equation contains, as constants, the angle of the cone and the diameter of the cable. The rule may be hooked over the top turn of cable, and the cable length determined from the reading at the bottom turn.

DETAILED DESCRIPTION

Figure 1:
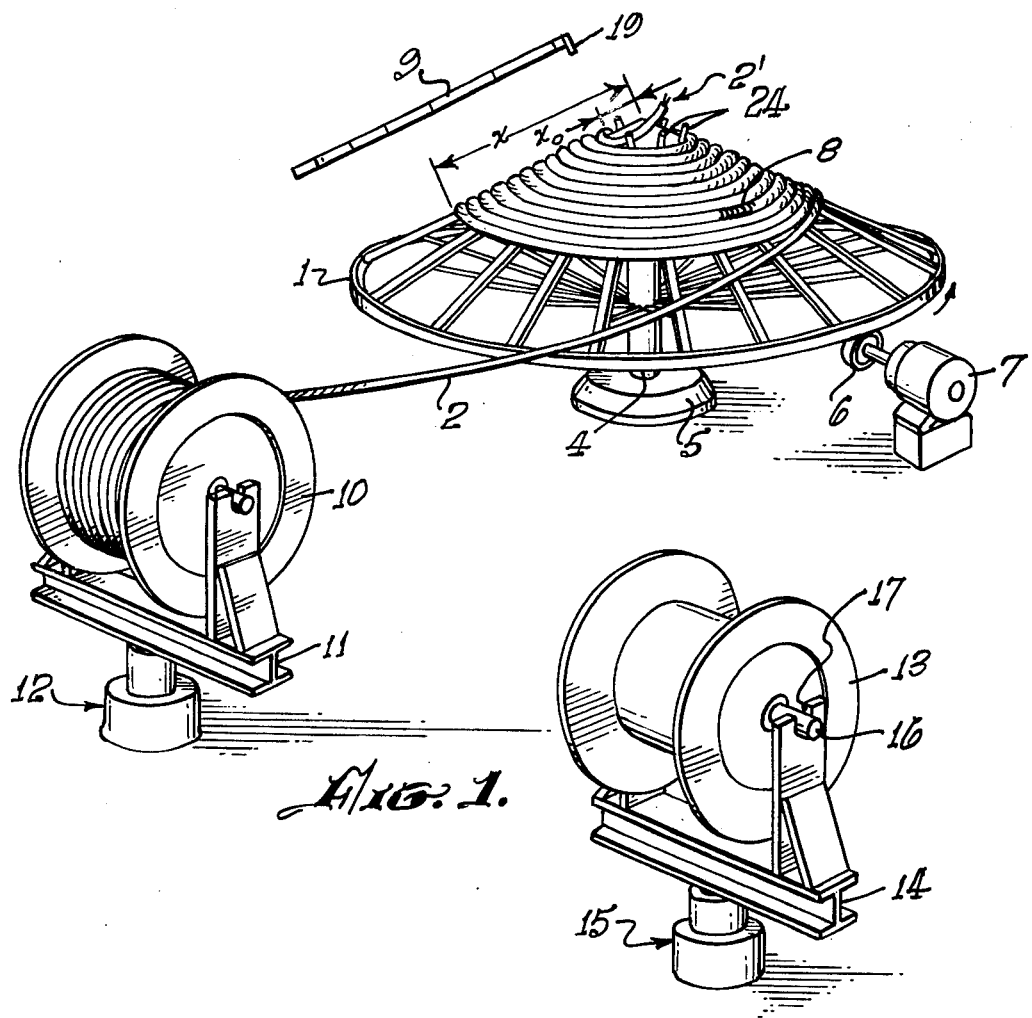
FIG. 1 is a simplified perspective view of a conical system according to the invention.

FIG. 1 shows a conical reel according to the invention at 1, and two conventional drum-type cable reels 10 and 13 mounted in swivelling cradles 11 and 14, respectively.

The conical reel 1 may be of skeleton construction, welded up, for example, from suitable lengths of steel angle, channel, and plate stock. It is rotatable around its vertical axis on shaft and bearing means of any suitable construction, indicated generally at 4. The bearing is preferably fixed in the ground in a poured concrete base. The conical reel 1 is preferably drivable at variable speed in either direction. This may be accomplished by means of a rubber-tired friction wheel 6, bearing against a rim portion of the cone 1 and rotatable by a variable-speed reversible electric motor 7. The motor 7 may be of the geared-down type. Typical reel speeds are of the order of 2 to 50 rpm.

In FIG. 1, the cradles 11, 14 for the accessory drum-type reels 10, 11 may be fabricated of suitable steel pipe, channel, plate, and H-column stock by welding. Each cradle is preferably mounted so that it can be swivelled about a vertical axis on suitable shaft and bearing means indicated generally at 12 and 15. The bearing portions are preferably set in poured concrete bases in the ground. The reels 10, 11 may be mounted in the cradles by passing suitable shafts 16 through their centers, and then lowering them into the slots 17 by means of a crane. The drum-type reels 10 and 13 are the type normally used for shipping and storing heavy cable, and are typically several feet in diameter. The conical reel 1 may be about 25 to 30 feet in diameter at its base.

Means, not shown, are preferably provided for driving the drum reels 10 and 13, for paying the cable in and out. These may employ reversible, variable-speed electric motors in a suitable known manner.

The inspection and testing of a reel of cable using the conical reel 1, FIG. 1, and a single drum reel 10, will now be described. Assuming that a cable is received for reconditioning, the reel is mounted in the cradle 11 in the manner described above. Then a length of cable 2 is paid out from reel 10, and its outer end 2' hooked between the rods or horns 24 at the top of the conical reel 1, to hold it in place. The cable is then slowly wound onto the conical reel, from the top down. An inspector may mark visible defects in the cable, working in cooperation with operators who control the drive motors on the reels 1 and 10. After all the cable has been wound onto the conical reel 1, electrical tests may be made, connecting leakage testers and other suitable instruments to the exposed conductors at the ends of the cable. Such tests may also be made while the cable is on reel 10.

The length of the cable, or of a desired portion of it, may be measured by hooking the end of rule 9, FIG. 1, over the top turn of cable and measuring the distance $x$ to the bottom end. The cable length thus measured may be expressed as:

$$L = 2\pi \sin \phi / d \, (x - x_0)^2,$$

where $L$ is the length of cable; $\phi$ is the half-angle of the cone measured between the axis and a cone element, typically 60° or 70°; $d$ is the diameter of the cable itself, and $x_0$ is the slant distance from the top turn of cable to the apex of the cone, which is fixed by the rods or horns 24, FIG. 1. A rule may be calibrated directly in feet or meters of length for various cable diameters, since the other parameters are constant for any particular installation. A 26-foot conical reel will hold approximately a mile of 1½-inch cable.

Figure 2:
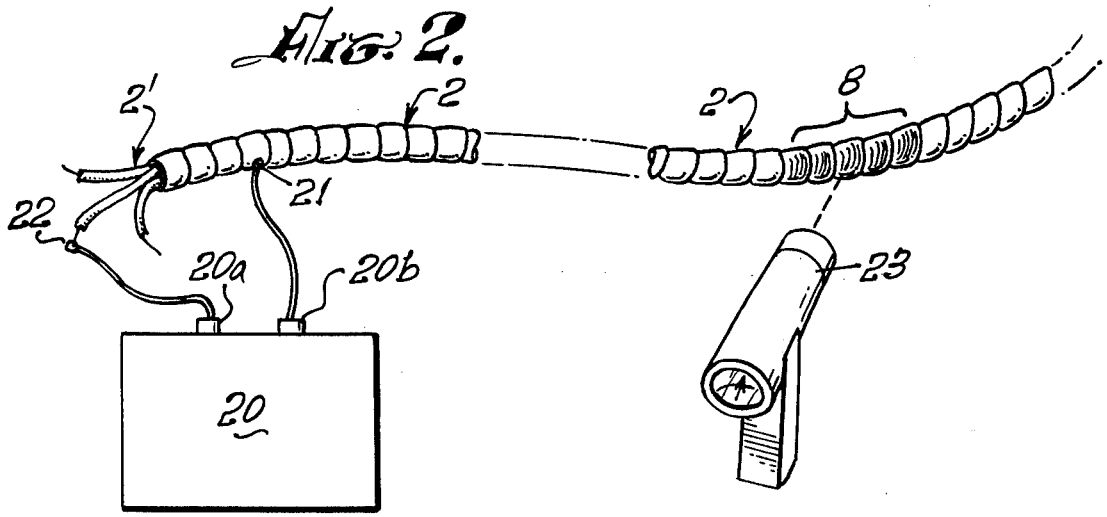
FIG. 2 is a diagram of an electrical and thermal means for locating shorts and grounds in a cable.

FIG. 2 shows generally a means for locating internal short-circuits or grounds in a cable. A power supply 20, capable of supplying, variably, up to a few kilowatts of power, is connected across the fault, in this case a ground between a conductor 22 and the cable armor at 21. The power is increased sufficiently to cause substantial heating at the location of the fault. In FIG. 2, the fault is indicated at 8. The resulting hot spot may be located by eye from the emission of smoke or fire. If the fault is of relatively high resistance, it may not get that hot; it may then be located by scanning the cable on the conical reel with a known type of infra-red radiation thermometer of the non-contacting type, as indicated at 23.

Figure 3:
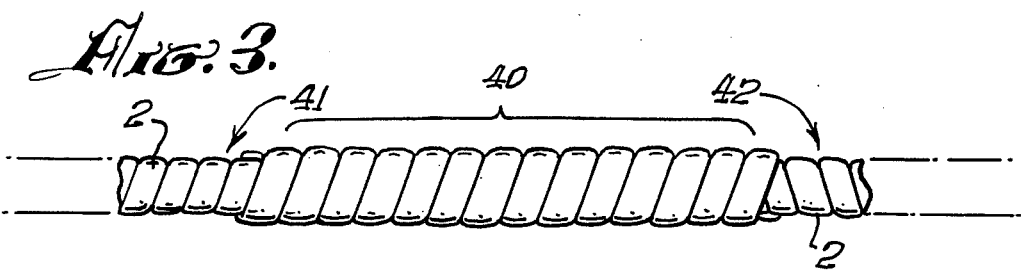
FIG. 3 is a view of a portion of armored cable showing an incorrect or reversed splice.

FIG. 3 shows a type of defect encountered in cables of the instant type, due to an error in previous repair. It is a splice 40 in which the lay or direction of the helix of the wrapped armor is opposite on either side of the splice 40, as indicated at 41 and 42. Such a splice is unduly susceptible to damage in handling. It should be cut out, then one section of the cable, as 42, turned end-for-end, and a new splice made. If, as often occurs, the shorter section is over a thousand feet long and weighs over a ton, the reversal of section 42 may be difficult. The second drum reel 13, FIG. 1, is useful in this process.

Referring back to FIG. 1, assume that a reversed, incorrect splice, such as 40 (FIG. 3), is encountered while the cable is being wound from shipping reel 10 onto conical reel 1. The splice may be cut out. The portion of the cable on conical reel 1 may then be wound onto the other drum reel 13, starting with its lower end. When this winding step is completed, the cut end will be on the inside of the winding on reel 13, and the former top end 2' on the outside. The end 2' may then be spliced to the cut free end of cable; the lay or helix direction of the wrapped armor will now be the same on both sides of the splice, as is desirable. The cradles 11, 14 of the drum reels 10 and 13 may be swivelled so that the reel axes are about parallel, as indicated in FIG. 4.

Figure 4:
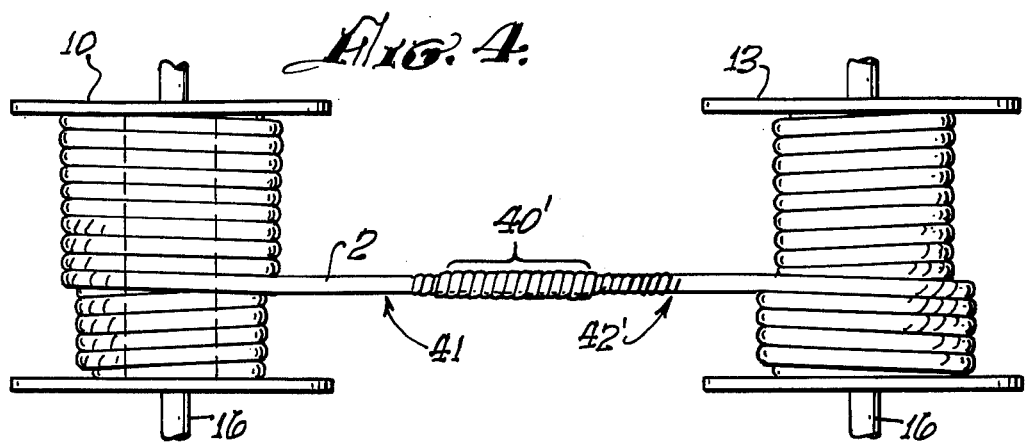
FIG. 4 is a top view of two drum-type reels illustrating the correction of a reversed splice.

FIG. 4 also shows the correct splice 40' after completion. The portion of cable 2 adjacent the right-hand side of the splice at 42' corresponds to the former top end of the cable 2' of FIG. 1.

After completing the splice 40', FIG. 4, nearly all the cable may be wound onto one of the drum reels, as 10, and the free end hooked between the rods or horns 14 at the top of the conical reel 1, and the process started over, winding the cable onto the conical reel 1; or if appropriate, it may be left on the drum reel.

Figures 5, 6:
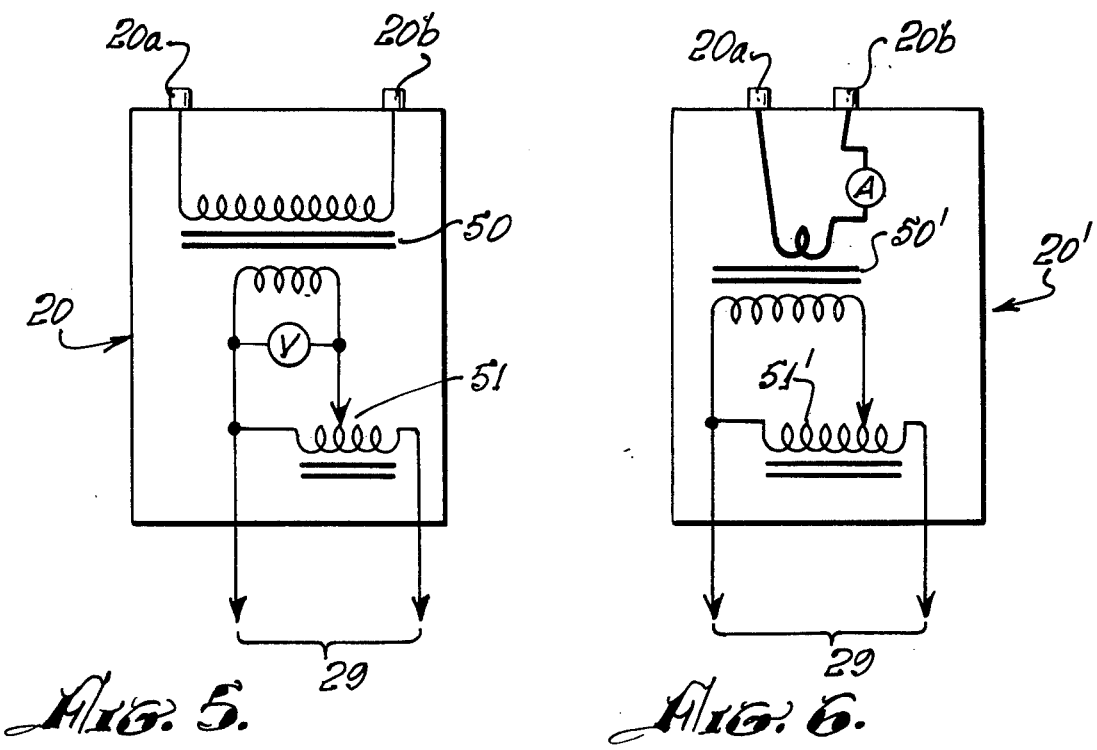
FIG. 5 is a diagram of a high-voltage power supply for locating relatively high-resistance faults.
FIG. 6 is a diagram of a low-voltage power supply for use in locating relatively low-resistance faults.

FIG. 5 shows a simplified diagram of a power supply 20 suitable for locating shorts or grounds of relatively high resistance. The output terminals 20a, 20b of supply 20 are connected to the secondary of a high-voltage step-up transformer 50, which may deliver of the order of 13 kilovolts maximum at several kilowatts of power. The primary of the transformer 50 may be connected to the output of a continuously-variable autotransformer 51, such as is sold under the trade name "Variac". The primary voltage may be monitored by a voltmeter V. The input leads 29 of the supply may be fed from a 220-volt commerical power line.

FIG. 6 shows a simplified diagram of a low-voltage, high-current power supply 20' suitable for locating short-circuits and grounds of relatively low resistance. Here, the output terminals 20a, 20b are connected to the secondary of a step-down transformer 50', which may be the type used in arc welders of 100 to 300 amperes capacity. Its primary, as in FIG. 5, may be fed from the output of a continuously-variable autotransformer 51', which in turn is fed from a 220-volt or other suitable power line via terminals 29. In a short of 0.1 ohm resistance, for example, a 200-ampere output from such a supply will produce heat at the rate of 4 kilowatts.

Referring back to FIG. 1, it is preferred to wind the cable onto the conical reel from the top. The turns have no tendency to slip down, since such slippage would entail an increase in the diameter of the bottom turn of cable. In winding from the top as shown, the turns lie in close contact, facilitating accurate length measurement with the novel rule 9.

I claim:

1. Apparatus for inspecting and testing electrical cable, comprising:
    a conical reel of generally frusto-conical shape having a half-angle greater than about 45 degrees and having its axis substantially vertical with its apex portion upward;
    means supporting said reel for rotation about its axis;
    motor means to rotate said reel, and auxiliary reel means for said cable,
    said cable being windable between said auxiliary reel means and said conical reel,
    the entire length of said cable being substantially exposed for inspection when wound on said conical reel,
    and means to test said cable electrically.

2. Apparatus as in claim 1, further comprising:
    a cable-engaging element protruding from said conical reel nears its apex portion and adapted to engage an end of said cable and to define the diameter of the first turn thereof,
    said cable being wound onto said reel downward from the top.

3. Apparatus as in claim 2, further comprising:
    a rule-like measuring element having a hook-like member at one end and adapted to be hooked over said first turn and to be extended along an alement of the cone of said conical reel and having graduations in terms of the length of cable according to the expression:

$$L = 2\pi \sin \phi/d\ (x - x_o)^2,$$

where $L$ is said length of cable from said first turn to any point $x$ along said element, $\phi$ is the half-angle of said cone, $d$ is the diameter of said cable, and $x_o$ is the slant distance from said first turn to the apex of said cone,
    said graduations setting forth successive values of $L$ at successive distances $x$ along said element.

4. Apparatus as in claim 1, said auxiliary reel means comprising:
    a first cradle for holding a drum-type cable reel and mounted to permit swivelling about a vertical axis,
    said first cradle being located to permit winding of cable between said drum-type reel and said conical reel.

5. Apparatus as in claim 4, further comprising:
    a second cradle generally similar to said first cradle and located to permit winding of cable between drum-type reels on said first and said second cradles, and either of said drum-type reels and said conical reel.

6. Apparatus as in claim 5, further comprising:
    separate manually-controllable variable-speed reversible motor drive means drivably engageable with each of the three said reels.

7. Apparatus as in claim 4, further comprising:
    a variable high-wattage power supply, and means to connect said supply to elements of said cable to produce a substantial hot spot at the location of a fault in said cable,
    said hot spot being unambiguously locatable when said cable is wound in a single layer on said conical reel.

8. Apparatus as in claim 7, further comprising:
    a non-contacting radiation thermometer to locate said heat by scanning said cable on said conical reel.

9. Apparatus as in claim 7, wherein said power supply is capable of supplying power of the order of a few kilowatts at a maximum voltage of at least 10,000 volts.

10. Apparatus as in claim 7, wherein said power supply is capable of supplying power of the order of a few kilowatts at relatively low maximum voltage and a maximum current of at least 100 amperes.

* * * * *